Sept. 2, 1969  J. P. SHAY ET AL  3,464,313
CALIBRATED SLOTTING TOOL
Filed Jan. 29, 1968  4 Sheets-Sheet 1
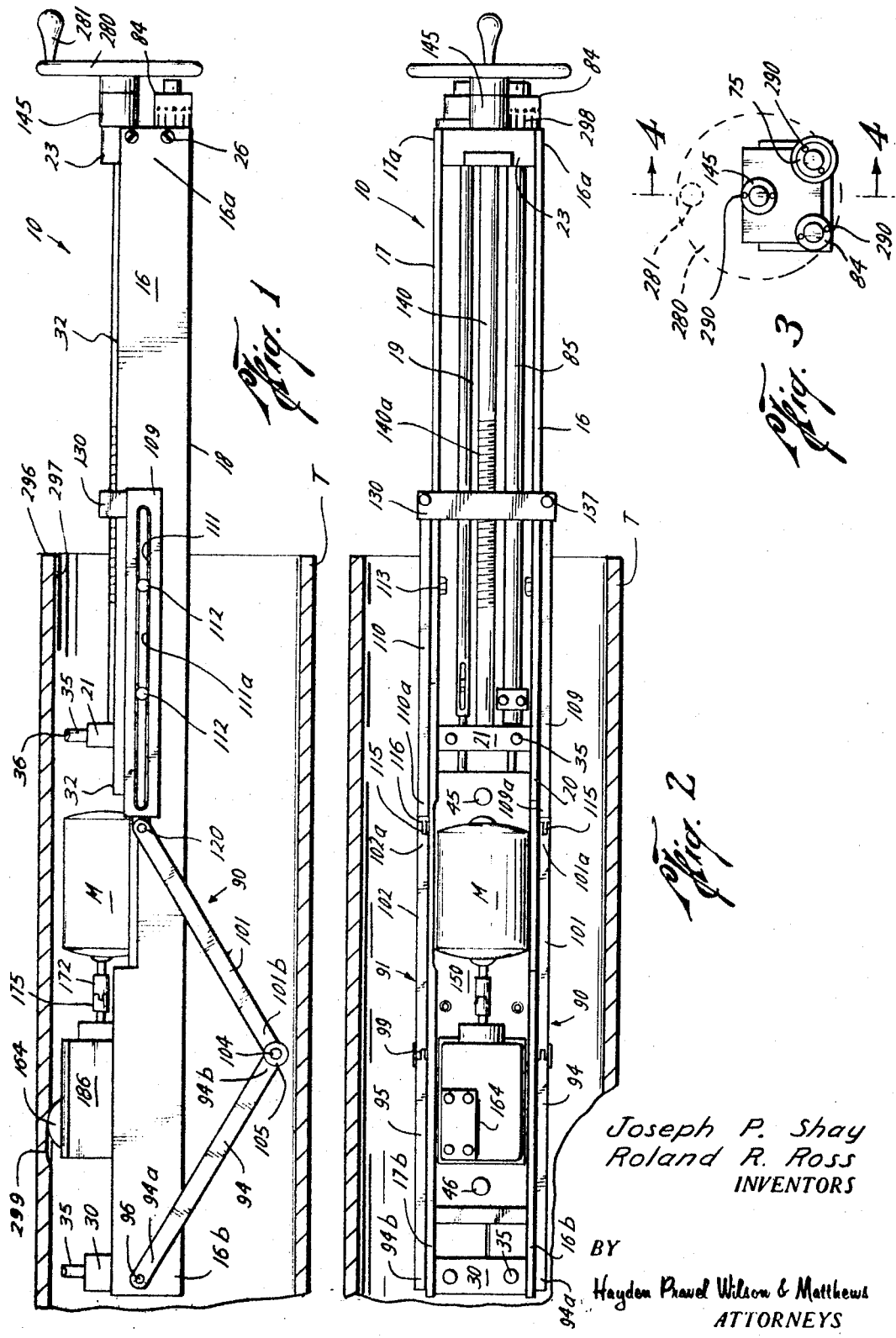
Joseph P. Shay
Roland R. Ross
INVENTORS
BY
Hayden Pravel Wilson & Matthews
ATTORNEYS

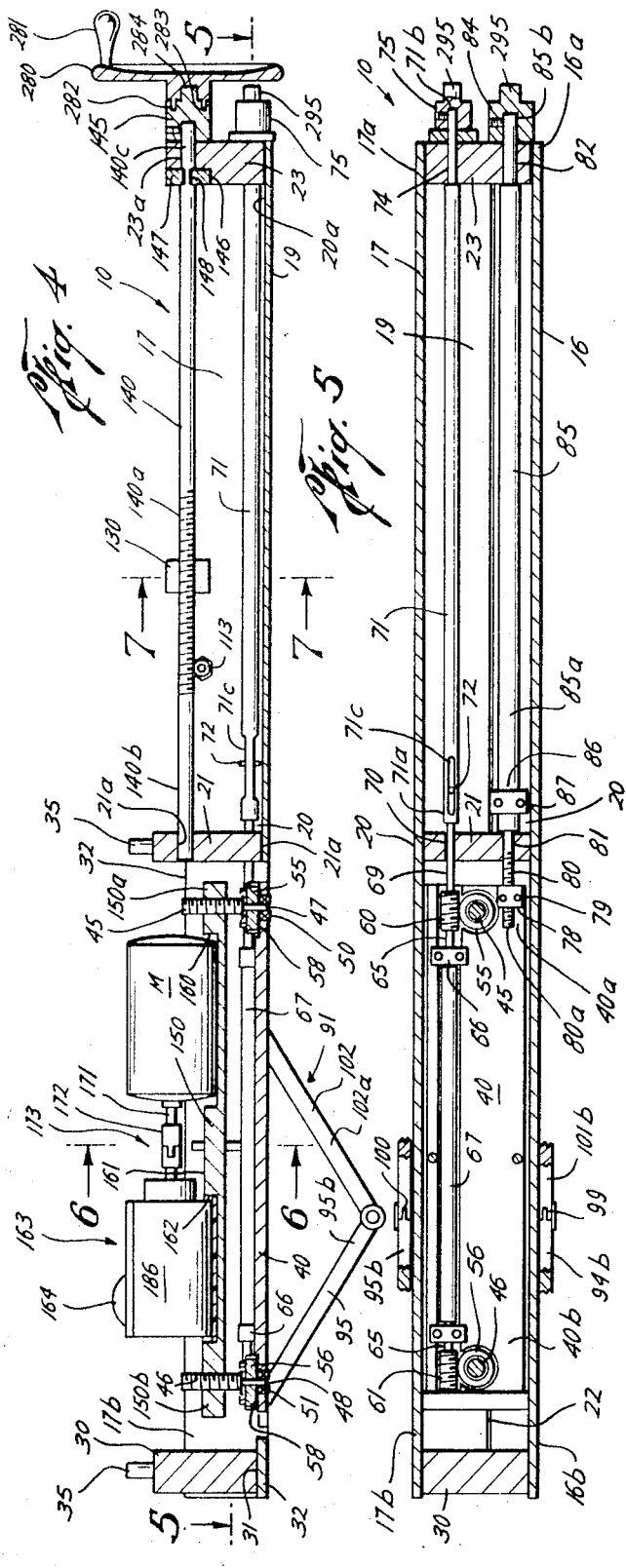

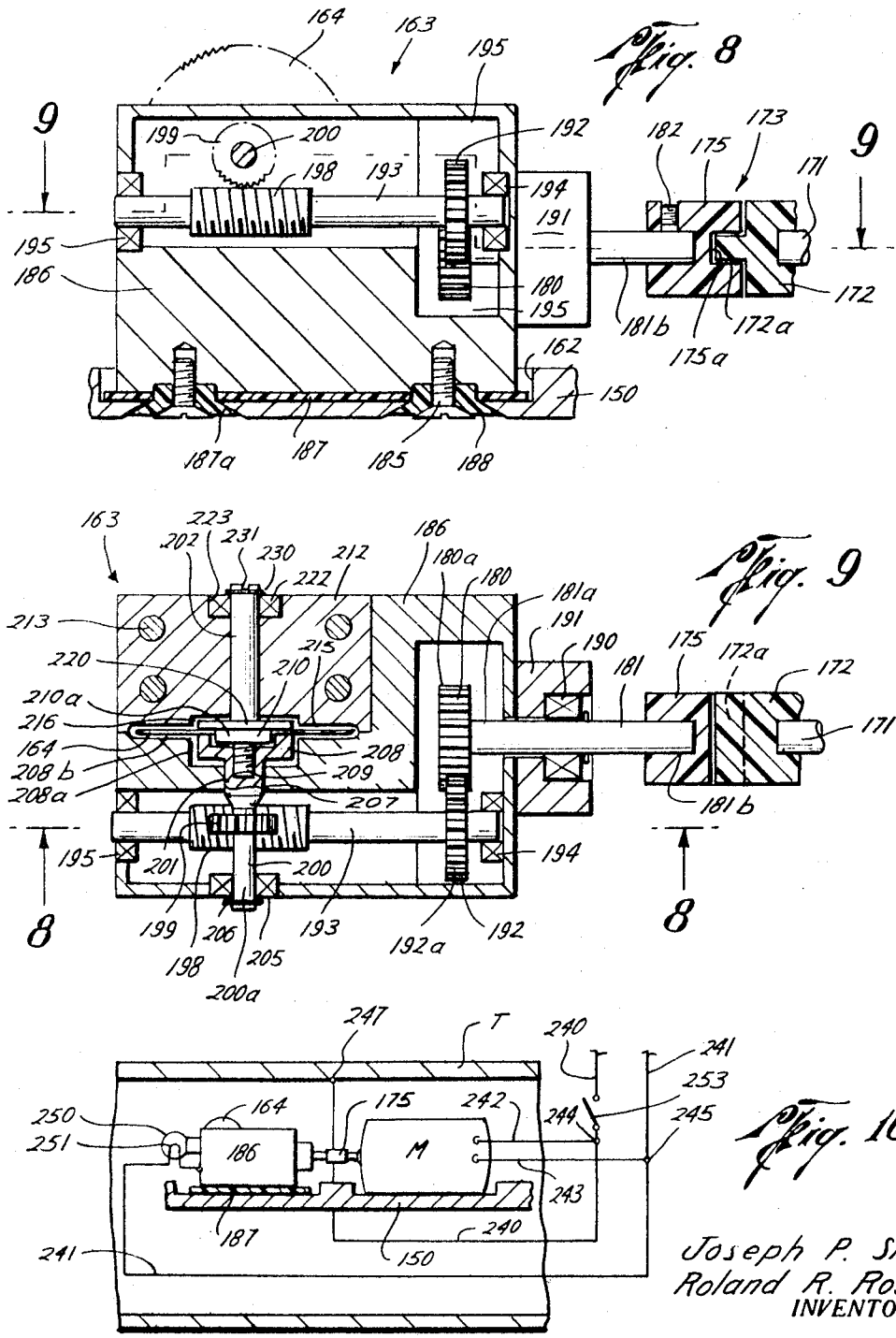

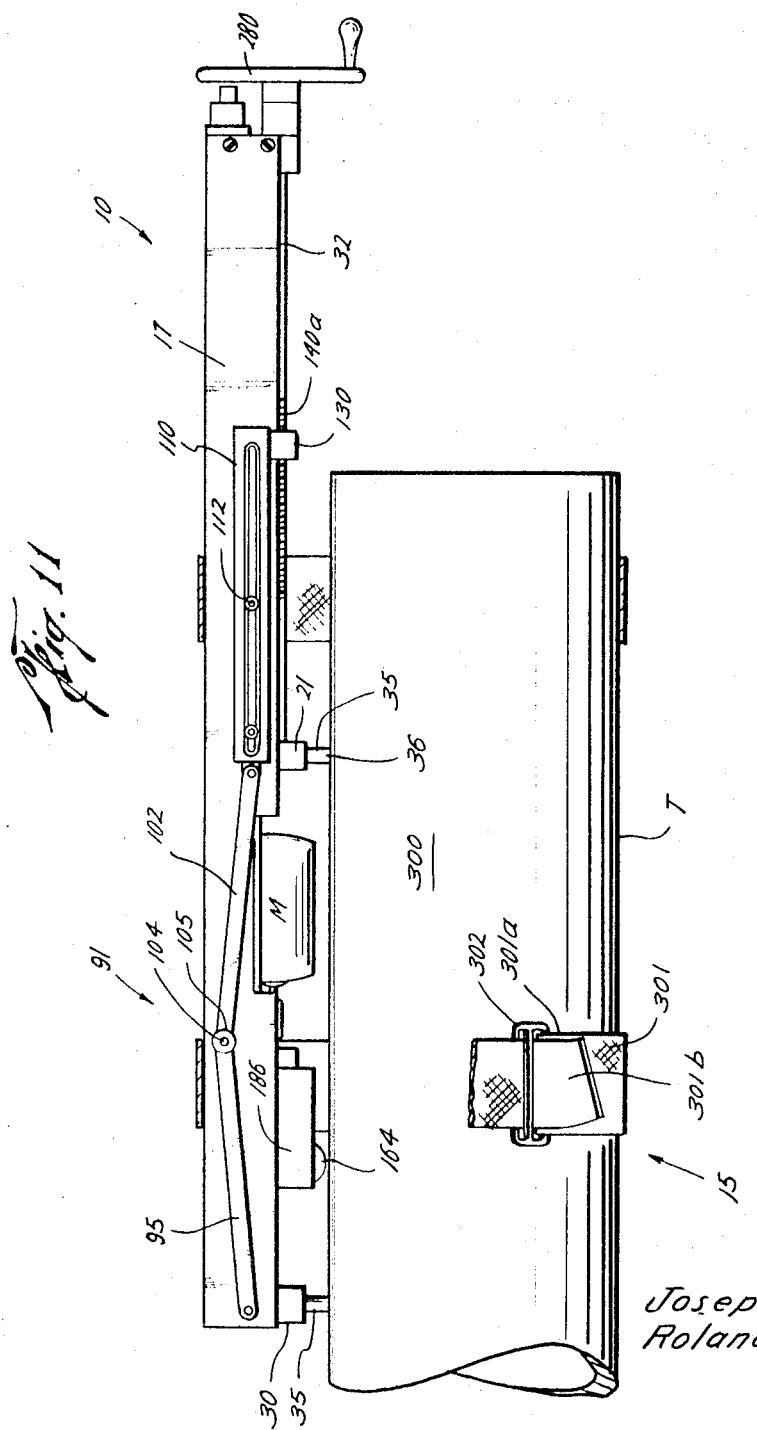

United States Patent Office 3,464,313
Patented Sept. 2, 1969

3,464,313
CALIBRATED SLOTTING TOOL
Joseph P. Shay, 2423½ W. Main, Houston, Tex. 77006, and Roland R. Ross, Houston, Tex.; said Ross assignor to said Shay
Filed Jan. 29, 1968, Ser. No. 701,430
Int. Cl. B23c 1/20, 3/28
U.S. Cl. 90—12                                    7 Claims

ABSTRACT OF THE DISCLOSURE

A lower platform member is positioned in guide slots of a pair of parallel upstanding side walls for movement of the lower platform member longitudinally relative to the side walls. An upper platform member is adjustably secured to the lower platform member to enable a cutting means positioned thereon to move upwardly and downwardly relative to the side walls for cutting a desired depth and longitudinal slot in pipe or other tubular members. A means for moving the upstanding side walls transverse to the pipe enables the upper platform and cutting means positioned thereon to be positioned immediately adjacent the pipe for minute calibrated adjustments by moving the lower platform in the guide slots and by adjusting the upper platform relative to the lower platform.

BACKGROUND OF THE INVENTION

Field of the invention

This invention relates to a calibrated slotting tool, and more particularly, to a new and improved calibrated slotting tool.

Description of the prior art

In the measurement of pipe or other tubular members by magnetic and radiation detection means for determining cracks, fissures, or other defects in the pipe, it is very diffirult to define various defects occurring in the pipe or tubular members without having some standard defect or measurement with the magnetic or radiation detection system for use as a comparison with the other defects.

The problem is further compounded by the fact that the purposefully formed defect made in the inspected pipe must be very accurately calibrated and measured so that any readout with respect to the inspection equipment can use the precisely formed slot in the pipe as a standard.

Prior patents, such as Patent No. 2,696,254, discloses a cutter which is positioned in an internal pipe or can for making a cut. However, such patent does not disclose an adjustment for precisely calibrating the depth of the slot and such invention requires an external roller for use in conjunction with the cutter.

SUMMARY OF THE INVENTION

Briefly, the present invention relates to a new and improved calibrated slotting tool wherein a precisely calibrated slot is cut in a pipe or other suitable tubular member by actuating a pair of pivotal arms to move a cutting means adjacent the pipe. The cutting means is then moved upwardly or downwardly and longitudinally relative to the pipe by calibrated measurements to form the calibrated slot in the pipe.

It is an object of the present invention to provide a calibrated slotting tool and more particularly a new and improved calibrated slotting tool.

Yet still another object of the present invention is to provide a tool for precisely cutting a slot in pipe wherein the depth length of the slot is precisely calibrated for use of the slot as a standard defect for enabling pipe inspection equipment to use the standard defect as a comparison with other defects found by the inspection equipment in tubular members.

Still yet another object of the present invention is to provide a new and improved calibrated slotting tool having a means for moving the tool immediately adjacent a pipe wall and a means for minutely, longitudinally, and transversely adjusting a cutting means with the tool for forming a slot in the wall of a tubular member.

BRIEF DESCRIPTION OF THE DRAWINGS

FIG. 1 is a side view of the calibrated slotting tool of the present invention positioned in the interior of a cross-sectioned tubular member;

FIG. 2 is a top view of the calibrated slotting tool of the present invention positioned in a cross-sectional tubular member;

FIG. 3 is an end view of the calibrated slotting tool of the present invention illustrating a wheel in dotted lines and three calibrated turning indicator attachments of the present invention;

FIG. 4 is a view taken along 4—4 of FIG. 3, partly in section, of the calibrated slotting tool of the present invention;

FIG. 5 is a top view, partly in section, taken along line 5—5 of FIG. 4 of the calibrated slotting tool of the present invention;

FIG. 6 is an end view, partly in section, taken along line 6—6 of FIG. 4 illustrating the relationship of a lower platform to an upper platform and a pair of parallel upstanding side walls;

FIG. 7 is an end view, partly in section, taken along line 7—7 of FIG. 4 illustrating the relationship of a pair of parallel upstanding side walls to a traveling block and a threaded pivotal arm moving shaft;

FIG. 8 is a cross-sectional view taken along line 8—8 of FIG. 9 illustrating the relationship of a plurality of gears of the cutting means and a gear reduction box of the present invention;

FIG. 9 is a cross-sectional view taken along line 9—9 of FIG. 8 illustrating the relationship of the same plurality of gears to a cutting means and gear reduction box of the present invention;

FIG. 10 is a partly schematic, partly sectional view illustrating the electrical connections of the present invention relative to a tubular member and cutting means of the present invention; and FIG. 11 is an elevated view of the calibrated slotting tool of the present invention strapped by suitable means to the exterior of a tubular member.

DESCRIPTION OF THE PREFERRED EMBODIMENTS

Attention is directed to FIGS. 1, 2, 4, and 5 wherein the slotted calibrating tool of the present invention is generally designated by numeral 10. As illustrated in FIGS. 1 and 2, the calibrated slotting tool 10 of the present invention is adapted to be positioned in pipe or other tubular members T or as illustrated in FIG. 11 is adapted to be positioned on the exterior of a tubular member T by strap means generally designated at 15 as will be explained hereinbelow.

The calibrated slotting tool of the present invention 10 includes a pair of upstanding parallel side walls 16 and 17 each having ends 16a, 16b, 17a, and 17b, respectively. As illustrated in FIGS. 2 and 5, a base member 19 is secured by any suitable means such as welding or nuts and bolts to the lower edge 18 of each of the side walls 16 and 17 and extends from the ends 16a and 17a of each of the side walls to a mid point 20 of each of the walls 16 and 17. A stationary block member 21 is secured at mid point 20 with each of the side walls 16 and 17 and the lower base member 19 along the lower edge 21a of the block member 21 (FIG. 4). It should be noted and as illustrated in FIG. 7 that the upstanding side walls 16 and 17 and lower base member 19 may be one integrally formed member and that the integrally formed member may include a split opening 22 for assembly of a lower platform member with the integrally formed member generally designated at 23 as will be brought out herein below.

A stationary block 23 is secured with each of the side walls 16 and 17 adjacent the ends 17a and 16a and the upper surface 20a of the lower base member 19 by any suitable means such as nut and bolt means 26 or by welding or the like.

Another stationary block member 30 is secured with each of the side walls 16 and 17 adjacent the ends 16b and 17b. An upper surface 31 of a lower base member segment 32 is secured with the block 30 and as illustrated in FIG. 5, block 30 is secured with each of the side walls 16 and 17 adjacent ends 16b and 17b, respectively, along the lower edges 18 thereof.

As illustrated in FIGS. 1, 2, and 4, stationary block members 21 and 30 extend upwardly above the upper edge 32 of the side walls 16 and 17. A pair of upstanding members 35 spaced relative to each other is secured to each of the respective blocks 21 and 30 and extends upwardly above the blocks. Each of the members 35 is ground so that the upper tip of such members 35 is slanted as at 36 (FIG. 1) for a purpose to be brought out hereinafter.

As illustrated in FIG. 6, the lower platform generally designated at 23 includes a lower platform member 40 which extends between the spaced walls 16 and 17. The platform 40 includes outwardly formed V sides 41 and 42 which fit into V-shaped guide slots 43 and 44 formed in each of the upstanding side walls 16 and 17, respectively, adjacent the lower edges 18 of each of the respective side walls 16 and 17. A pair of threaded bolts 45 and 46 is secured with the lower platform member 40 adjacent each end 40a and 40b thereof, respectively. A pair of stationary rotating members 47 and 48 is secured with the lower ends of each of the bolts 45 and 46, respectively, and extends downwardly into the lower platform member 40 to be secured to bearing members 50 and 51, respectively, for enabling the upstanding threaded bolts 55 to rotate. A pair of threaded bolt gear means 55 and 56 is circumferentially received by the members 47 and 48 (FIG. 4), respectively, immediately adjacent the bearing members 50 and 51, respectively, in depression seats 58 formed in the upper surface of the movable lower platform member 40. A pair of shaft gear means 60 and 61 is positioned immediately adjacent and intermeshed transverse to the threaded bolt gear means 45 and 46, respectively, so that rotation of the shaft gear means 60 and 61 will impart rotation to the threaded bolt gear means 55 and 56 to thereby impart rotation to the upstanding threaded bolts 45 and 46.

Each of the shaft gear means 60 and 61 is connected to each other by an extension shaft 65, each of which shafts 65 is secured by connection means 66 to an interconnecting shaft 67 extending between the shaft gear means 60 and 61. A milled depression 68 (FIG. 6) in the lower platform 40 maintains the shaft 67 in an aligned position.

An extension shaft 69 secured with the shaft gear means 60 extends outwardly through an opening 70 in the block 21 to be telescopically received by an end 71a of a calibrating shaft 71. Slots 71c formed adjacent the ends 71a of the calibrating shaft 71 receive the outwardly extending tabs 72 secured with the extension shaft 69 such that longitudinal movement of the lower platform member 40 moves the tabs 72 longitudinally in the slots 71c while maintaining the calibrating shaft 71 connected with the extension shaft 69.

The calibrating shaft 71 extends outwardly and parallel to the upstanding side walls 16 and 17 through an opening 74 in the stationary block member 23 and is secured at an end 71b with a calibrating turn member indicator 75.

As illustrated in FIG. 5, a shaft receiving means 78 is secured with the lower platform member 40 adjacent the end 40a thereof and is secured to the member 40 by suitable threaded screw means 79. A threaded extension shaft 80 is threadedly received within the threaded shaft receiving means 79 adjacent an end 80a of the threaded extension shaft 80. The shaft 80 extends outwardly parallel to the upstanding side walls 16 and 17 through an opening 81 in the stationary member 21 for connection with shaft 85. The shaft 85 extends parallel to side walls 16 and 17 outwardly through an opening 82 in the stationary member 23 adjacent an end 85b thereof for connection of the end 85b to a calibrated turning member indicator 84. A retainer member 86 secured to the base member 19 with suitable brad means 87 adjacent end 85a of shaft 85 retaining the shaft 85 in alignment with the extension shaft 80.

A pair of pivotal arms generally designated at 90 and 91 each includes a first arm 94 and 95, respectively. An end 94a and 94b of each of the arms 94 and 95, respectively, is secured to upstanding walls 16 and 17, respectively, by pivot pins 96. The other end 94b and 95b of each of the arms 94 and 95 includes an extended tab 99 received in a U-shaped slot 100 of a second pair of arms 101 and 102, respectively, with ends 101b and 102b of the second arms 101 and 102, respectively, of each of the pair of pivotal arms 90 and 91, respectively. The interconnected ends 94b, 101b, 95b, and 102b are secured to each other by a cross pin 104 and sleeve 105 which receives the pin 104 such that pivotal movement of either of the arms 90 or 91 will cause the other respective arm to also pivot.

A pair of movable arms 109 and 110 is movably secured with side walls 16 and 17, respectively, by having slot means 111 in each of the movable arms 109 and 110 receive tab means 112 so that the tab means 112 engage lips 111a of the slot means 111. The tab means 112 are secured to the side walls 16 and 17 by nut means 113 (FIGS. 2 and 4) or by securing the tab means 112 to the stationary block 21 (FIG. 1). An end 109a and 110a of each of the arms 109 and 110 includes tab members 115 extending outwardly therefrom to be received into U slots 116 formed in each of the ends 101a and 102a of each of the second arms 101 and 102, respectively. The ends 101a and 102a of each of the arms 101 and 102 and the ends 109a and 110a of each of the movable arms 109 and 110 are secured to each other by pivot screw means 120 which secure the tabs 115 in the U-shaped slots 116 of each of the arms 101, 109, 102, and 110, respectively.

A traveling block 130 includes a portion 130a which extends downwardly into the space between the upstanding side walls 16 and 17 as illustrated in FIG. 7. A pair of U-shaped recesses 131 and 132 formed in the block 130 receives the side walls 16 and 17, respectively, so that a pair of downwardly extending arm portions 133 and 134 of the traveling block 130 contact movable arms 109 and 110 adjacent ends 109b and 110b, respectively. Threaded bolts 137 are received in the recessed openings 138 in each of the depending arms 133 and 134 to threadedly connect the arms 133 and 134 with the movable arms 109 and 110, respectively, so that movement of the traveling block 130 will impart movement of the movable arms 109 and 110 parallel to the side walls 16 and 17.

A threaded pivotal arm moving shaft 140 is threaded along a portion 140a thereof and extends into an opening 21a of the stationary member 21 adjacent an end 140b thereof. The threaded portion 140a of shaft 140 is received by a threaded opening 130a of the block 130. The other end 140c of the shaft 140 extends through an opening 23a in the stationary member 23 and is secured adjacent such end 140c to a calibrated turning knob indicator 145. As illustrated in FIG. 4, a depression 146 formed in stationary member 23 receives a retainer member 147 which circumferentially is received in a slot 148 in the shaft 140 formed by the reduction in diameter of the shaft 140 at that point to retain the shaft 140 in a stationary rotatable aligned relationship between the stationary block 23 and 21.

As illustrated in FIGS. 4 and 6, an upper platform 150 is spaced from the lower platform 40 and is provided with threaded openings (not numbered) adjacent each end 150a and 150b thereof for receiving the upstanding threaded bolts 45 and 46, respectively. A pair of guide members 154 and 155 is threadedly secured adjacent each end 154a and 155a with the lower platform 40 and each member extends upwardly through openings 156 and 157, respectively, in the upper platform 150 for guiding movement of the upper platform 150 relative to the lower platform 40 on the upstanding threaded bolts 45 and 46, respectively, as will be brought out hereinbelow. A seat 160 formed in the upper surface 161 of the upper platform member 150 receives a motor means M and a seat 162 formed in the upper surface 161 of the upper platform 150 and receives and cutting means generally designated at 163 and a gear reduction block member 186. The cutting means 163 includes a cutting blade 164 as illustrated in the preferred embodiment, but it should be understood that a drill or other suitable cutting means may be substituted for the blade 164 for cutting a precisely calibrated slot in the tubular member T.

A rotatable shaft 171 extends outwardly from the motor means M and is secured to a male member 172 of a shaft connection member generally designated at 173.

As illustrated in FIGS. 8 and 9, the male member 172 includes an outwardly extending tab 172a received in a U-shaped slot 175a of a female member 175 of the shaft connection member 173. A rotatable shaft means 181 is secured at one end 181b with the female member 175 by lock screw 182 and extends outwardly therefrom into opening 195 formed in the gear reduction member 186 to receive a gear means 180 having teeth 180a.

As illustrated in FIG. 8, the cutting means 163 and block 186 are secured with the upper platform 150 in the seat 162 by screws 185 which are threadedly engaged and extend upwardly into block member 186. An insulation and grounding pad 187 is positioned between the block member 186 and upper platform 150 with the washer members 188 fitting into the washer depression seats 187a of the upper platform 150, grounding member 187, and block member 186 to provide suitable insulation for the screws 185. The grounding pad 187 also serves as a cushion for the cutting means 163 and block 186.

The shaft 181 extends through bearing member 190 and block member 191 for connection with the gear 180. It is, of course, to be understood that the bearing member 190 operates in the usual manner to enable the shaft 181 to rotate and for preventing leakage of fluids and the like. Gear means 180 is interconnected with gear 192 in opening 195 by having the teeth 192a of gear 192 intermesh with the teeth 180a of gear 180. The gear 192 is secured with a shaft 193 in opening 195, which shaft 193 is supported by suitable rotatable bearing means 194 and 195 in block 186 to enable the shaft 193 to rotate.

Also received in the opening 195 in the block member 186 is a longitudinal rotatable gear member 198 mounted with shaft 193 (not numbered) intermeshed with a transversely positioned gear 199. Gear member 199 is secured to a shaft 200 which extends transversely to shaft 193 and 181.

Shaft 200 is divided into a female section 201 and a male section 202. The end 200a of the female section 201 is secured to a bearing means 205 which enables the shaft 200 to rotate with a ring member 206 secured adjacent the end 200a of the shaft outside the block member 186 for retention of the end 200a with the bearing means 205.

The female portion 204 includes an enlarged portion 207 integrally secured and connected with a head member 208 which is received in the seat 208a of block member 186. A threaded recessed opening 209 is formed in the head member 208 as illustrated in FIG. 9.

The male member 202 of shaft 200 includes a threaded bolt 210 having a head 210a for threadedly engaging the threads on the bolt 210 with the threads in the threaded opening 209. A removable block member 212 is secured by suitable screw bolts 213 to the gear reduction block member 186 and is milled to include a slight depression 215 and seat member 216. As illustrated in FIG. 8, the block 186 is also milled so that the circumferential area immediately adjacent the head 208 and seat 208a forms a circumferential depression 208b. The blade 164 is secured with the head 210a which is received in the depressions 208b and 215 of the block members 186 and 212, respectively. The head member 210a is secured to a cross member 220, which cross member 220 is secured to a shaft 221 of the male member 202, which shaft 221 extends through the block member 212.

As further illustrated in FIG. 8, a bearing member 222 is seated in a seat 223 formed in the block member 212 and receives the shaft 221. A suitable ring retainer 230 is secured to that portion of the shaft extending outwardly from the bearing member 222 to retain the shaft 221 in its present position.

As illustrated in FIG. 8, if it is desired to remove the cutting blade 164, the bolts 213 are removed so that the block 212 is removed from the shaft 221. A screw driver (not shown) is inserted in a screw driver slot 231 at the end of the shaft 221 and the shaft 221 is rotated in a counterclockwise direction which imparts rotation to the bolt 210 connected to the shaft 221 to enable the bolt 210 to be removed from the threaded opening 209 so that the blade 164 secured between the head 210a of the bolt 210 and the member 220 can be removed.

As illustrated in FIG. 10 with the slotted calibrating tool of the present invention 10 positioned in the tubular member T, the motor means M is secured to a suitable power source through electrical conduits 240 and 241. Conduits 242 and 243 are electrically connected to the conduits 240 and 241, respectively, at points 244 and 245. Conduit 240 is electrically connected at 247 to the tubular member T and conduit 241 is electrically connected to the block member 186 which is supported by the grounded pad 187. A bulb 250 including a filament 251 positioned therewith is provided for indicating when the calibrated slotting tool 10 of the present invention has been switched on by an electrical switching means 253.

When the electrical switching means 253 is turned on, such electrical means, of course, actuates the motor means M through the electrical conduits 242 and 243. Actuation of the motor means M imparts rotation to shaft 171, interconnection member 175, shaft 181, and gear means 180. Rotation of gear means 180 imparts rotation to gear means 182 which thereby imparts rotation to the shaft 193 and gear 198. As gear 198 rotates, such rotation imparts rotation to gear means 199 which imparts rotation to the shaft 200 to thereby impart rotation to the cutting blade 164.

As illustrated in FIGS. 1, 2, and 4, a wheel 280 including a gripping knob 281 includes prong members 282 and 283 with a slot 284 between said prong members 282 and 283. Each of the calibrated turning knob indicators such as 75, 84, and 145 secured with the shafts 70, 85, and 140, respectively, includes openings 290 for interchangeably receiving the prongs 282 and 283 of the interchangeable wheel 280 and extension members 295 which fit into the seat 284 between the prongs 282 and 283. Thus, the wheel 280 is interchangeable with respect to each of the calibrated turning knob indicators 75, 84, and 145 for adjustment of the calibrated slotting tool 10 of the present invention as desired.

In the operation of the invention and as illustrated in FIG. 1, the calibrated slotting tool of the present invention 10 is normally positioned in a tubular member T with the turning wheel 280 extending outwardly from the end 296 of the tubular member T.

The wheel 280 is then positioned on the turning knob indicator 145 to rotate the threaded shaft 140. Rotation of the shaft 140 causes the traveling block 130 to move in a desired direction along the threaded portion 140a of the shaft 140. As the traveling block 130 moves along the shaft, the movable arms 109 and 110 secured with the traveling block are moved parallel to the side walls 116 and 117, respectively. The movable arms 109 and 110 are retained with the side walls 116 and 117, respectively, by the tab members 112.

Movement of the movable arms 109 and 110 causes the ends 101b and 102b of the arms 101 and 102 to move in the direction of movement of the arms 109 and 110, respectively. As the ends 101b and 102b of the arms 101 and 102 are moved, such arms pivot about pivot pin 120, respectively, which movement imparts pivotal movement of the ends 101b and 102b, respectively, of the arms 101 and 102 about the pivot pin 104 and sleeve 105. Movement of the ends 101b and 102b also imparts pivotal arcuate movement to the ends 94b and 95b of arms 94 and 95 which in turn imparts pivotal movement to the ends 94a and 95a, respectively, of the arms 94 and 95 about the pivot pins 96 secured with each of the arms, respectively. Such movement of the pivotal arms 90 and 91 positions the upstanding side walls 16 and 17 and base member 19 adjacent the interior wall 297 of the tubular member T as desired and, of course, moves the upstanding side walls 16 and 17 and base member 19 away from the interior wall 297 of the tubular member T as desired.

When the arms 90 and 91 move the upstanding side walls 16 and 17 and lower base member 19 adjacent the interior wall 297 of the tubular member T, the wheel 180 can then be positioned on the calibrated turn knob indicator 84 to rotate the shaft 85 secured with the threaded shaft segment 80 which in turn is received by the bolt receiving means 79. Rotation of the shaft 85 and the threaded segment 80 in the shaft receiving means 79 causes the lower platform 40 to move longitudinally relative to the upstanding side walls 16 and 17 and tubular member T in the V guide slots 43 and 44 formed in the side walls 16 and 17, respectively, to minutely longitudinally position and carry the cutting means 162 and upper platform 150 to a desired location inside the tubular member T. As illustrated in FIGS. 1 and 3, the calibrated turning knob indicator 84 is provided with suitable calibrations 298 for indicating the distance of longitudinal movement. It is, of course, to be understood that the other turning knob indicators 75 and 145 are also provided with calibrations for indicating transverse movement relative to the tubular member T.

The wheel 280 is then positioned on the calibrated turning knob indicator 75 for rotation of the calibrating shaft 71 which imparts rotation to the shaft gear means 60 and 61. Rotation of shaft gear means 60 and 61 in turn imparts rotation to the threaded bolt gear means 55 and 56, respectively, which causes the upstanding threaded bolts 45 and 46 to rotate about the members 47 and 48, respectively. Rotation of the upstanding threaded bolts 45 and 46 causes the upper platform 150 to move upwardly and downwardly as desired on the threaded bolt. As illustrated in FIG. 1, the cutting blade 164 is moved upwardly by upward movement of the upper platform 150 so that rotation of the cutting blade 164 forms a suitable calibrated depth slot 299 in the interior wall 297 of the tubular member T.

It is, of course, to be understood that when the desired depth slot 299 has been reached and precisely calibrated, the wheel 280 can be positioned on the calibrated turning knob indicator 84 to cut a longitudinal slot in the interior wall 297 of the tubular member T by rotation of the shaft 85 relative to the threaded shaft receiving means 79 secured with the lower member 40.

As illustrated in FIG. 11, the calibrated slotting tool 10 of the present invention may be positioned on the outer surface 300 of the tubular member T by turning the invention over such that the upper edge 32 of the upstanding side walls 16 and 17 now extend toward the tubular member T and such that the members 35 extend downwardly to contact the outer surface 300 of the tubular member T. In this position, the slanted edges 36 engage the similar circularly slanted surface of the outer surface 300 of tubular member T so that the calibrated slotting tool 10 of the present invention is firmly positioned on the tubular member. The strapping means generally designated at 15 includes a strap 301 secured at one end 301a with a buckle means 302 and an end 301b which is engaged and retained by the buckle means 302 in a manner well known in the art. The strap 301 is positioned and strapped around the tubular member T to enclose the calibrated slotting tool 10 of the present invention adjacent the pivotal arms 90 and 91 and side walls 16 and 17 as illustrated in FIG. 11. It should be noted that the pivotal arms 90 and 91 have been lowered such that the arms are positioned substantially parallel to the upstanding side walls 16 and 17.

With the strap 301 securely tightened to the buckle means 302, the calibrated slotting tool 10 of the present invention is firmly secured to the tubular member T to enable the blade 164 to cut a suitable calibrated desired depth and longitudinal slot in the outer surface 300 of the tubular member T as disclosed hereinabove.

The foregoing disclosure and description of the invention are illustrative and explanatory thereof, and various changes in the size, shape, and materials as well as in the details of the illustrated construction may be made within the scope of the appended claims without departing from the spirit of the invention.

We claim:
1. A tool for precisely slotting pipe comprising:
 (a) a base member;
 (b) a pair of parallel upstanding, spaced side walls secured longitudinally with said base member, each of said walls having a parallel guide slot therein;
 (c) a lower platform member slidably secured on each side with one of each of said guide slots, said lower platform member being positioned parallel to said base member;
 (d) an upper platform member spaced from and positioned parallel to said lower platform member;
 (e) means for moving said upper platform member relative to said lower platform member, said base member and said side walls;
 (f) means for moving said lower platform member in said guide slots;
 (g) means for moving said base member and upstanding side walls transverse to the pipe; and
 (h) cutting means mounted with said upper platform member for cutting slots in the pipe wherein said means for moving said base member and upstanding side walls transverse to the pipe is actuated to move said cutting means adjacent the pipe and said means for moving said lower platform member is adjusted to longitudinally precisely position the cutting means immediately adjacent the pipe to enable said means for moving said upper platform relative to said lower platform member to move said cutting means upwardly to cut a precisely positioned and calibrated desired depth slot in the pipe.

2. The structure as set forth in claim 1 wherein said means for moving said upper platform member relative to said lower platform member includes:
   (a) a pair of upstanding threaded bolts spaced longitudinally relative to said upper and lower platform members, each of said bolts being threadedly secured at one end with said upper platform member and rotatably secured at the other end with said lower platform member;
   (b) threaded bolt gear means secured with each of said threaded bolts adjacent said lower platform;
   (c) shaft gear means intermeshed with each of said lower platform gear means; and
   (d) a shaft mounted with each of said shaft gear means and extending parallel to said side walls wherein rotation of said shaft imparts rotation to said shaft gear means and threaded bolt gear means wherein said threads rotate to move said upper platform member and cutting means upwardly and downwardly on said bolts.

3. The structure as set forth in claim 2 including:
   (a) a calibrating shaft having slots in one end adjacent said platforms;
   (b) said calibrating shaft telescopically receiving said shaft mounted with each of said gear means;
   (c) tab members extending outwardly from said shaft mounted with each of said shaft gear means, said tab members extending outwardly into one of each of said slots of said calibrating shaft for connecting said shafts wherein said shaft mounted with said shaft gear means is permitted to move longitudinally as said lower platform member moves in said guide slot and wherein said tab members move longitudinally in said slots as said lower platform is moved longitudinally; and
   (d) a calibrated turning member mounted at the other end with said calibrating shaft for calibrated longitudinal movement of said upper platform.

4. The structure as set forth in claim 1 wherein said means for moving said lower platform member in said guide slots includes:
   (a) a threaded bolt receiving means mounted with said lower platform; and
   (b) a threaded shaft received by said threaded bolt receiving means, said lower platform means moving longitudinally parallel to said side walls in said guide slots upon rotation of said threaded shaft in said threaded shaft receiving means mounted with said lower platform member.

5. The structure as set forth in claim 1 wherein said means for moving said base member and upstanding side walls transverse to the pipe includes:
   (a) a pair of pivotal arms, one of each of which is secured at one end with one of each of said upstanding side walls; and
   (b) means mounted with the other end of each of said pivotal arms for moving said arms to various desired pivotal portions wherein said arms position said side walls and base member relative to the pipe.

6. The structure as set forth in claim 5 wherein each of said pivotal arms includes:
   (a) a first arm pivotally secured at one end with one of each of said side walls; and
   (b) a second arm pivotally secured at one end with the other end of said first arm wherein movement of the other end of said second arm causes said first and second arms at their common connected end to move inwardly and outwardly relative to said upstanding side walls as desired.

7. The structure as set forth in claim 6 wherein said means mounted with the other end of each of said pivotal arms includes:
   (a) a pair of slotted, movable arms, one of each of said slotted arms being secured at one end to the said other end of one of each of said second arms;
   (b) tab means secured extending through each of said slots to movably secure one of each of said movable arms to one of each of said side walls;
   (c) traveling block means secured with the other ends of each of said arms, said traveling block means having a threaded opening therein; and
   (d) a threaded pivotal arm moving shaft threadedly interconnected with said traveling block means wherein rotation of said threaded shaft in said threaded block means causes said block means to move to thereby impart movement of said slotted movable arms relative to said tab means and wherein movement of said slotted arms causes movement of said other end of said second arms to cause pivotal movement upwardly and downwardly of said pivotal arms.

References Cited
UNITED STATES PATENTS

| | | | |
|---|---|---|---|
| 1,457,193 | 5/1923 | Smith et al. | 90—15 |
| 1,550,257 | 8/1925 | Hopper | 90—15 X |
| 3,354,784 | 11/1967 | Zemberry | 90—12 |

ANDREW R. JUHASZ, Primary Examiner

GIL WEIDENFELD, Assistant Examiner

U.S. Cl. X.R.

83—5, 187; 90—14, 15